(No Model.)
H. L. HOLLIS.
METHOD OF REMOVING TIN FROM TIN PLATE SCRAP.
No. 511,774. Patented Jan. 2, 1894.
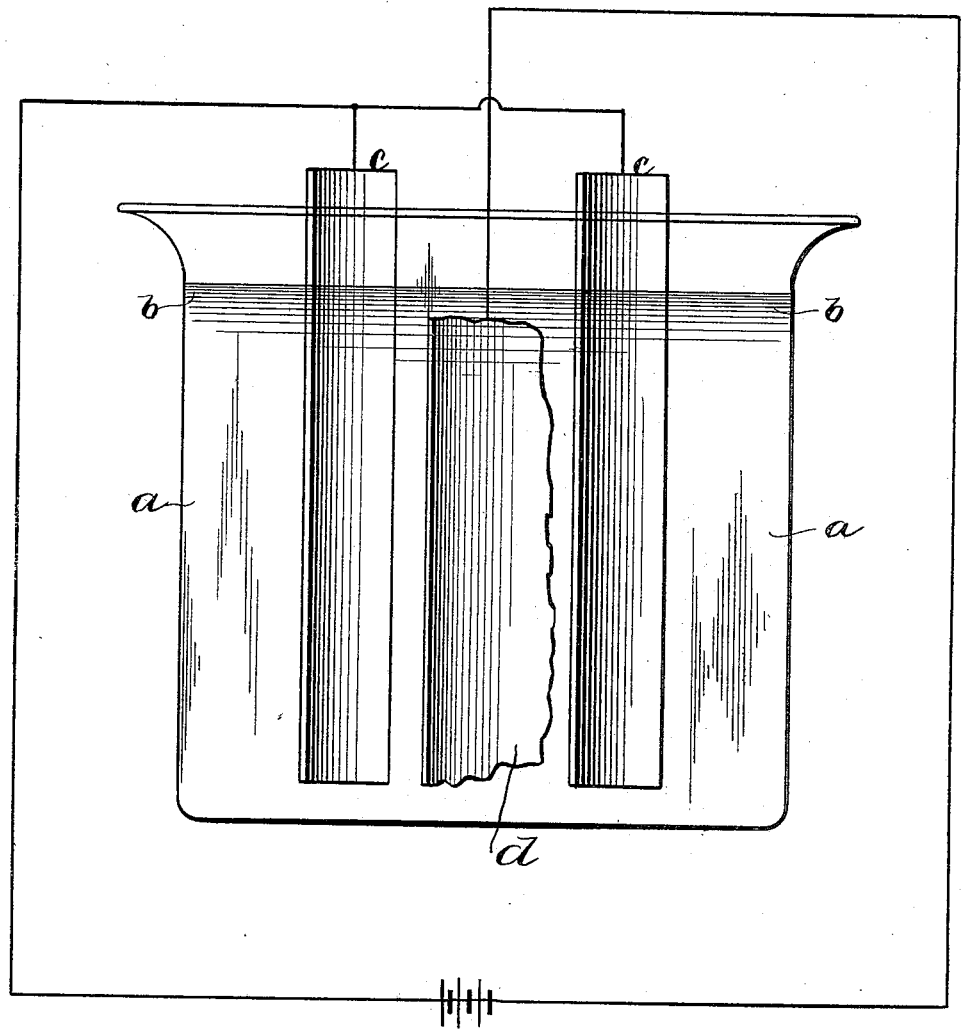
Witnesses
George L. Cragg
George McMahon
Inventor:
Henry L. Hollis
By Barton + Brown
Atty's

UNITED STATES PATENT OFFICE.

HENRY L. HOLLIS, OF CHICAGO, ILLINOIS.

METHOD OF REMOVING TIN FROM TIN-PLATE SCRAP.

SPECIFICATION forming part of Letters Patent No. 511,774, dated January 2, 1894.

Application filed January 13, 1892. Serial No. 417,922. (No specimens.)

*To all whom it may concern:*

Be it known that I, HENRY L. HOLLIS, a citizen of the United States, residing at Chicago, in the county of Cook and State of Illinois, have invented a certain new and useful Improvement in Methods of Removing Tin from Tin-Plate Scrap, (Case No. 2,) of which the following is a full, clear, concise, and exact description, reference being had to the accompanying drawing, forming a part of this specification.

My invention relates to a method of removing the tin from tin plate and tin plate scrap, and it has for its principal object the provision of an economical process of removing tin from tin plate scrap, thereby rendering said scrap available for many purposes. The presence of tin upon the iron of tin plate scrap has been the difficulty in the way of making use of this important waste product in iron and steel manufacture.

Efforts have been made hitherto by means of acids and various other means to remove the tin from the iron plate of tin plate scrap, but the processes so employed have been expensive and troublesome, and have not gone largely into use. I have discovered that by the use of a dilute acid in combination with an electric current of suitable strength, the tin upon the tin plate scrap is quickly and completely removed, thus leaving the iron clean and available for many uses, and allowing the tin also to be recovered and made use of.

It is well known that acids like sulphuric and hydrochloric will attack both tin and iron, but when much diluted their action is very slight. When, however, the action of this dilute acid is aided by the electric current, the tin coating upon the iron plate is promptly and completely removed. The rapidity with which the tin coating is removed from the iron is within certain limits proportional to the strength of the current. I find that with a solution of two and one-half per cent. of hydrochloric acid, and by that I mean two and one-half parts hydrochloric acid of 1.20 specific gravity and ninety-seven and one-half parts of water, and a current of one-half an ampère, the coating of the tin on the tin plate is entirely removed in about ten minutes. I have verified the complete separation of the tin from the iron by careful chemical analyses.

By reference to the accompanying drawing, the process which I have invented will be more clearly understood.

The vessel $a$ may be of any suitable size and shape to contain the dilute acid solution $b\ b$.

The negative electrodes $c\ c$ may be placed one on each side of the tin plate scrap $d$, which is entirely immersed in the dilute acid solution. The negative electrodes $c\ c$ are connected in any suitable way with the negative pole of the source of electricity, and the tin plate scrap is connected suitably with the positive pole of the source of electricity. One or more negative electrodes may be used as desired.

The strength of the acid solution may be varied within wide limits without departing from the spirit of my invention. I do not desire to limit myself to any special acid, nor to any certain strength of acid solution; neither do I wish to limit myself to any particular mode of connecting the electrodes with the source of electricity, nor to any specific strength or intensity of electric current.

I believe that my process by which I use the electric current in conjunction with the acid solution to remove tin from tin plate scrap is an entirely new and original one, and What I desire to secure by Letters Patent is—

The process of removing tin from tin plate scrap, which consists in connecting said scrap with the positive pole of a source of electricity, immersing the scrap in an acid solution of a strength which will not of itself appreciably attack the tin and iron of said scrap, and passing a current of electricity through said scrap and said solution, whereby the removal of the tin from the scrap is effected, without materially increasing the temperature of said solution substantially as described.

In witness whereof I hereunto subscribe my name this 5th day of January, A. D. 1892.

HENRY L. HOLLIS.

Witnesses:
   CHARLES A. BROWN,
   GEORGE L. CRAGG.